United States Patent [19]
Konshin et al.

[11] 3,804,563
[45] Apr. 16, 1974

[54] SPINDLE ASSEMBLY

[76] Inventors: Anatoly Sergeevich Konshin, ulitsa akademika Komarova, 9a, kv. 103; Viktor Borisovich Zenkin, ulitsa Bagritskogo, 61, kv. 33; Vyacheslav Serafimovich Zatsepin, Beskudnikovsky bulvar, 50, kv. 28; Vladislav Nikolaevich Arofikin, B.Akademicheskaya ulitsa, 14, kv. 71; Oleg Nikolaevich Trifonov, Novolesnaya ulitsa, 3, korpus 2, kv. 51, all of Moscow, U.S.S.R.

[22] Filed: Feb. 7, 1972

[21] Appl. No.: 223,871

[52] U.S. Cl.................. 418/164, 418/58, 418/220
[51] Int. Cl. .............................................. F01c 1/00
[58] Field of Search ........ 418/55, 58, 220, 227, 164

[56] References Cited
UNITED STATES PATENTS
1,575,987  3/1926  Gilman .............................. 418/55
3,181,472  5/1965  Sennet .............................. 418/164

*Primary Examiner*—C. J. Husar
*Attorney, Agent, or Firm*—Waters, Roditi, Schwartz & Nissen

[57] ABSTRACT

A non-cantilevered cutting tool is mounted in the spindle assembly on a radial support which is made in the form of a helical-tooth spur-gear drive comprising at least two coaxial sun wheels with a provision for relative rotation, and a cage with sockets for the planet pinions which are in constant mesh with at least one sun wheel, said cage forming helical spaces with the teeth of said sun wheel and planet pinions, being sealed at the end by the device for supplying service fluid to said helical spaces at one end of the cage and discharging it at the other end, so that said gear drive functions as a hydraulic motor for rotating the tool secured on the output member of said drive.

5 Claims, 8 Drawing Figures

SPINDLE ASSEMBLY

The present invention relates to metal-cutting machines and more specifically it relates to their spindle assemblies.

Most successfully, this invention can be utilized for machining profiles of various kinds in small-diameter holes (20–50 mm) including helical toothed surfaces.

Known in the art are the spindle assemblies used in, say, internal grinding machines wherein the non-cantilevered cutting tool is mounted on a radial support. These known spindle assemblies differ from one another in the type of the tool rotating drive.

For example, in the SM118 internal grinder manufactured by "Hirt," Federal Republic of Germany, the cutting tool is rotated by an electric motor via a Vee-belt drive, the cutting tool being fastened to the output member of said drive. Such a tool rotation drive is in widespread use, for example in the spindle assemblies of the machines manufactured by "Michigan Tool," USA, Model MHGGJ–20×3–FA manufactured by Fritz Verner, Western Berlin, Model 3–275, "Churchill," England, in special machines and in the machines Model 586B, USSR.

Also known in the art is another type of rotation drive for the cutting tools used in the machines, Model KS–4 manufactured by "Saurer," Switzerland. In the spindle assemblies of these machines the tool arbour is made integrally with the hydraulic motor in the form of a turbine wheel. Said turbine wheel is rotated by the velocity head of the service fluid, which falls under pressure from the nozzle on the blades of the turbine wheel.

In these known spindle assemblies the surface subjected to the effect of the driving forces is constituted by the open peripheral surface of the tool arbour. The possibility of increasing the dimensions of this surface is always strictly limited by the dimensions of the holes to be machined. As a result, the power that can be developed by the drives of these spindle assemblies depends mainly on the efficiency with which the driving forces directly act on the arbour surface.

If the spindle assembly utilizes a belt drive, the efficiency of the driving forces is determined by the coefficient of friction between the belt and pulley. However, operation of the belt drive in the atmosphere laden with abrasive dust (if a grindstone is used for a cutting tool) and in contact with the cutting fluid leads to premature wear of the belt, a reduction in the coefficient of friction and, as a consequence, to a reduction of power and speed rigidity of the drive.

If the spindle assembly is driven by a hydraulic motor, the efficiency of the driving forces depends on the efficiency of automatic interrelation between the load applied to the cutting tool and the energy of the service fluid developed by the pump in the hydraulic drive. However, said interrelation is almost nonexistent in the known spindle assemblies because the turbine wheel is rotated by an open stream of fluid.

The use of any additional devices, e.g. belt guards or devices for sealing off the space through which the service fluid is delivered to the turbine wheel yields poor results since all these devices cannot be used unless the dimensions of the driven surface and, consequently, the drive power, are reduced. Thus, the known designs of the spindle assemblies are not adapted for applying high power to the cutting tool and cannot provide for a high stability of the cutting speed. All these factors reduce the accuracy of machining and the output of the machines equipped with these spindle assemblies.

Besides, the belt-driven spindle assemblies cannot be used for machining helical toothed surfaces in small-diameter and long holes.

An object of the present invention is to eliminate the aforesaid disadvantages.

Another important object of the present invention is to provide such a spindle assembly which, being smaller than the known spindle assemblies of the same type, would accommodate a powerful hydraulic motor and ensure a high stability of cutting speed.

This and other objects of the invention are accomplished by providing a spindle assembly wherein non-cantilevered cutting tool is mounted on a radial support, is driven by a hydraulic motor and wherein, according to the invention, the radial support is made in the for a helical-tooth spur-gear drive. The gear drive comprises two coaxial sun wheels with a provision for their relative rotation and a cage with sockets accommodating the planet pinions which are in constant mesh with at least one sun wheel, said cage forming, together with the teeth of this sun wheel, and those of the planet pinions, helical spaces hermetically separated from each other along the tooth contact lines and sealed off at the ends by the device for the positive supply of the service fluid to said helical spaces from one end of the cage and its discharge from the other end so that said gear drive serves as a hydraulic motor for rotating the tool secured to the output member of said drive.

For the successful accomplishment of the object of the invention it is practicable to use a spindle assembly comprising one sun wheel with external teeth rigidly secured to the immovable member of the assembly while the cage is set in rotation by the pinions rolling around said sun wheel and serves as an output member of the drive, carrying the cutting tool.

It is no less practicable that a spindle assembly should be used comprising one internal-tooth sun wheel rotated by the pinions turning in the sockets of the cage rigidly secured on the immovable member of the assembly, and serving as the output member of the drive carrying the cutting tool.

The object of the invention will also be successfully achieved if the spindle assembly comprises two sun wheels one of which, with external teeth, is rigidly secured on the immovable member of the assembly while the other wheel with internal teeth is rotated when the planet pinions roll around the external-tooth sun wheel and serves as an output member of the drive, carrying the cutting tool.

It is also good to use a spindle assembly accommodating two sun wheels one with external teeth and the other one with internal teeth, the latter serving as an output member of the drive and carrying the cutting tool, both wheels being rotated when the planet pinions turn in the sockets of the cage rigidly secured to the immovable member of the assembly.

Owing to such an arrangement, the spindle assembly according to the present invention, combines small size with a highly powerful hydraulic motor and ensures a hgh stability of the cutting speed.

Now the present invention will be described in detail by way of examples with reference to the accompanying drawings, in which.

Figure 1:
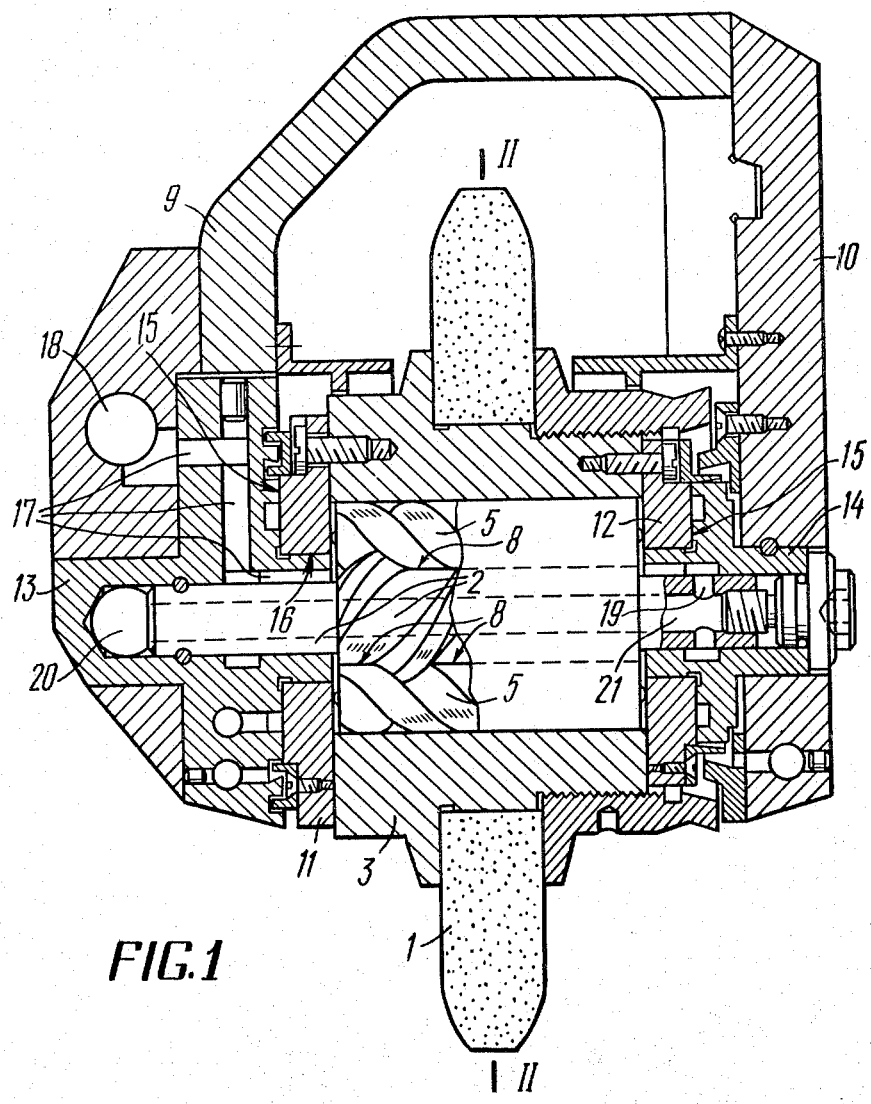
FIG. 1 is a longitudinal section of the spindle assembly according to the invention, partly cut away, with the cage serving as the output driven member of the drive.

We hereby claim a spindle assembly with a noncantilevered cutting tool 1 (FIGS. 1 and 2) mounted on a radial support and rotated by a hydraulic motor.

According to the invention, the radial support is made in the form of a helical-tooth spur-gear drive comprising a sun wheel 2 and a cage 3 with a provision for their relative rotation, said cage 3 being provided with sockets 4 for planet pinions 5. The planet pinions 5 are in constant mesh with the sun wheel 2. The cage 3, together with the teeth of the wheel 2 and planet pinions 5, forms helical spaces 6 and 7 hermetically separated along the tooth contact line 8 (FIG. 2) between the sun wheel 2 and planet pinions 5. The cage 3 is sealed off at the ends by a device for the positive supply of the service fluid to said helical spaces 6 and 7 at one end of the cage and discharging said fluid at the other end.

Figure 2:
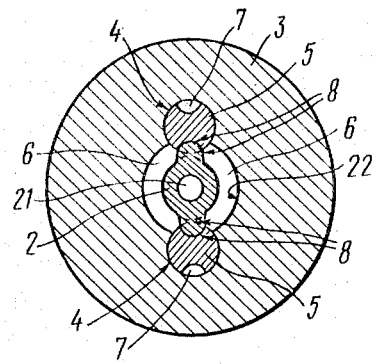
FIG. 2 is a section taken along line II—II in FIG. 1.

Shown in FIGS. 1 and 2 is a spindle assembly wherein, according to the invention, the sun wheel 2 has external teeth and is rigidly secured by its journals on the housing 9 and its cover 10 which jointly constitute the immovable member of the assembly.

The cutting tool 1 is rigidly fastened on the cage which is rotated by the planet pinions 5 rolling around the sun wheel 2. Thus, the cage 3 is the output (driven) member of the drive.

The above-mentioned device (FIG. 1) comprises flanges 11 and 12 rigidly connected to the corresponding end of the cage 3 and flanges 13 and 14 connected, respectively, to the housing 9 and its cover 10.

The flanges 11, 13 and 12, 14 form movable end seals 15 and radial seals 16. The flange 13 is provided with a channel which communicates the fluid supply channel 18 with the helical spaces 6 and 7 adjoining the flange 11.

The flange 14 has a channel 19 which communicates the helical spaces 6 and 7 adjoining the flange 12 with the channel 20 used to discharge the service fluid through the channel 21 in the sun wheel 2.

Axial supports are constituted by the movable end seals between the flanges 11, 13 and 12, 14.

The spindle assembly illustrated in FIGS. 1 and 2 operates as follows.

The service fluid is supplied under pressure from the hydraulic system (not shown in the drawing so as not to obscure the main idea of the invention) through the channels 18 and 17 to the helical spaces 6 and 7 adjoining the flange 11. The flow of the service fluid along the axis of the sun wheel 2 from flange 11 to flange 12 shifts the tooth contact lines 8 of the meshing planet pinions and sun wheel in the same direction. Inasmuch as the teeth mesh along the matching helical surfaces, the forced displacement of the contact lines 8 along the axis of the sun wheel 2 causes the planet pinions 5 to roll over the sun wheel 2. Constant meshing of the planet pinions 5 with the sun wheel 2 is ensured by the cylindrical shape of the cage sockets 4 which serve as a radial support during rotation of the planet pinions, also by locating these sockets at an accurately calculated distance from the axis of the sun wheel 2.

As a result, rolling of the planet pinions 5 around the sun wheel 2 will cause rotation of the cage 3 which serves as an output driven member of the drive, carrying the cutting tool 1. The origination and vanishing of the contact lines 8 is caused, respectively, by meshing of the teeth at the side of the flange 11 and their demeshing at the side of the flange 12.

Whatever the angular position of the planet pinion 5 relative to the sun wheel 2, there always is a certain number of helical spaces 6 and 7 separated by two or more contact lines 8. The service fluid contained in these helical spaces is separated both from the helical spaces adjoining the flange 11 and from those adjoining the flange 12.

As the teeth come gradually out of mesh, these spaces are put in communication with the channel 19 of the flange 14 and the service fluid flows out through the channels 21 and 20.

Hermetic separation of the spaces adjoining the flange 11 from similar spaces adjoining space 12 at any angular position of the planet pinions relative to the sun wheel 2 is ensured by efficient separation of the helical spaces from each other because the cylindrical sockets 4 and the internal cylindrical surface 22 of the cage 3 fit with small clearances around the outside diameter of the teeth of the planet pinions 5 and sun wheel 2, respectively, and owing to hermetic separation of each of the helical spaces 6 and 7 by one or more tooth contact lines 8. The meshing pairs of teeth come in contact simultaneously on both flanks of the tooth and throughout its depth.

Such a contact of the teeth can be obtained if, for example, the tooth profiles in the section normal to the planet pinion rotation axis are described by the matching epicycloid and hypocycloid curves or by the arcs of the circumference with the same radius when the convex helical surface meshes with a concave surface.

The constant pressuretight separation of the helical spaces communicating with the fluid supply channel 18 from similar spaces communicating with the fluid discharge channel 20 makes it possible to ensure a correspondence between the power built up by the service fluid and, consequently, the power developed by the pump in the hydraulic system, and the power produced by the cutting tool 1 in the course of cutting.

The rotation speed of the planet pinions 5 around their own axis, as a consequence, the rotation speed of the cage 3 with the cutting tool 11 will always correspond to the rate of flow in a unit of time of the service fluid passing through the fluid supply channel 18. In other words, the flow rate of the service fluid in a unit of time will always be directly proportional to the area of the helical recesses in the plane perpendicular to the planet pinion rotating axis, to the pitch of the helical spaces and the rotation speed of the planet pinions 5 around their own axis in a unit of time and inversely proportional to the coefficient accounting for the fluid leaks through the moving and immovable clearances.

The torque developed by the cutting tool in the process of cutting will always vary directly as the pressure drop between the channels 18 and 20 and will depend on the value of the pressure developed by the hydraulic system.

The change in this pressure drop corresponding to the change in the torque of the cutting tool 1 will change the amount of fluid leaks through the clearances and, consequently, the speed of the cutting tool 1.

However, such a dependence of the fluid leaks on the change in the pressure drop can be determined in advance. The use in the hydraulic system of additional devices compensating for the fluid leaks, controlled directly by the pressure drop between the channels 18 and 20 can stabilize the rotation speed of the cutting tool 1 to a considerable extent without increasing the overall dimensions of the spindle assembly since devices of such kind can be installed directly in the hydraulic system, separately from the spindle assembly.

On the grounds of the above considerations, it follows that the spindle assembly according to the present invention provides for automatic control of the drive operation for maintaining a constant rotation speed of the cutting tool in the course of cutting, makes it possible to deliver a high power to the cutting tool and, in a number of cases, to dimenish the dimensions of the spindle assembly because the size of its radial support serving simultaneously as the hydraulic motor is not greater than that of the radial supports provided with ball bearings in the known spindle assemblies. The spindle assembly illustrated in FIGS. 1 and 2 can be used most successfully in grinding machines characterized by a high cutting speed and, consequently, high rotation speeds of the cutting tool 1, in this case grindstone. This is attributable to the fact that in the claimed spindle assembly the stability of the position of the cutting tool rotation axis in the radial direction under the effect of both external and internal dynamic forces, i.e., the damping ability as well as the supporting power stiffness of its radial support grow with the increased rotation speed of the cage 3 carrying the grindstone, relative to the sun wheel 2. A high damping and supporting power as well as the stiffness of the radial support of the spindle assembly are explained by the fact that the two surfaces in said support moving relatively to each other ,(rolling of convex surfaces over the concave surfaces in the gear drive and sliding of the external cylindrical helical tooth surfaces of the planet pinions 5 in the cylindrical sockets 4 of the cage) have the curvature radiuses closely approaching each other in size, a large mutual contact area; and are constantly separated by oil layers. These oil layers are formed due to a hydrostatic effect arising in the clearance between the meshing teeth and owing to a hydrodynamic effect in the clearance between the planet pinions 5 and the cage sockets 4. The higher the rotation speed of the planet pinions 5 in the cage sockets, the stronger the hydrodynamic forces developed in the oil clearance and the higher the stiffness and supporting power of the radial support. Besides, an increase in the external load applied to the cutting tool 1 increases the pressure drop between the channels 18 and 20, thereby raising the hydrostatic pressure in the zones of the contact line of the meshing teeth and increase the supporting power and stiffness of the radial support.

The planetary rotation of the planet pinions 5 around the sun wheel 2 and a constant oil clearance separating the planet pinions from their matching surfaces create an effect of automatic balancing of the rotating members in the spindle assembly which improves the resistance of the position of the cutting tool rotation axis to the effect of vibration.

The experiments have shown that the spindle assembly shown in FIGS. 1 and 2 can be used to the greatest advantage in the capacity of a high-speed spindle assembly for finish-grinding of tooth surfaces in small holes, 20–50 mm in diameter.

Figure 4:
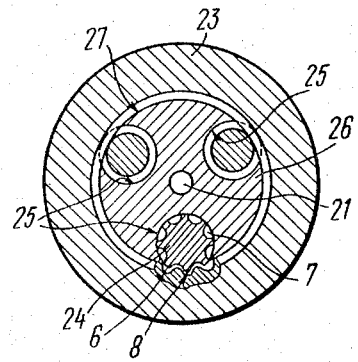
FIG. 4 is a section taken along line IV—IV in FIG. 3.
Figure 3:
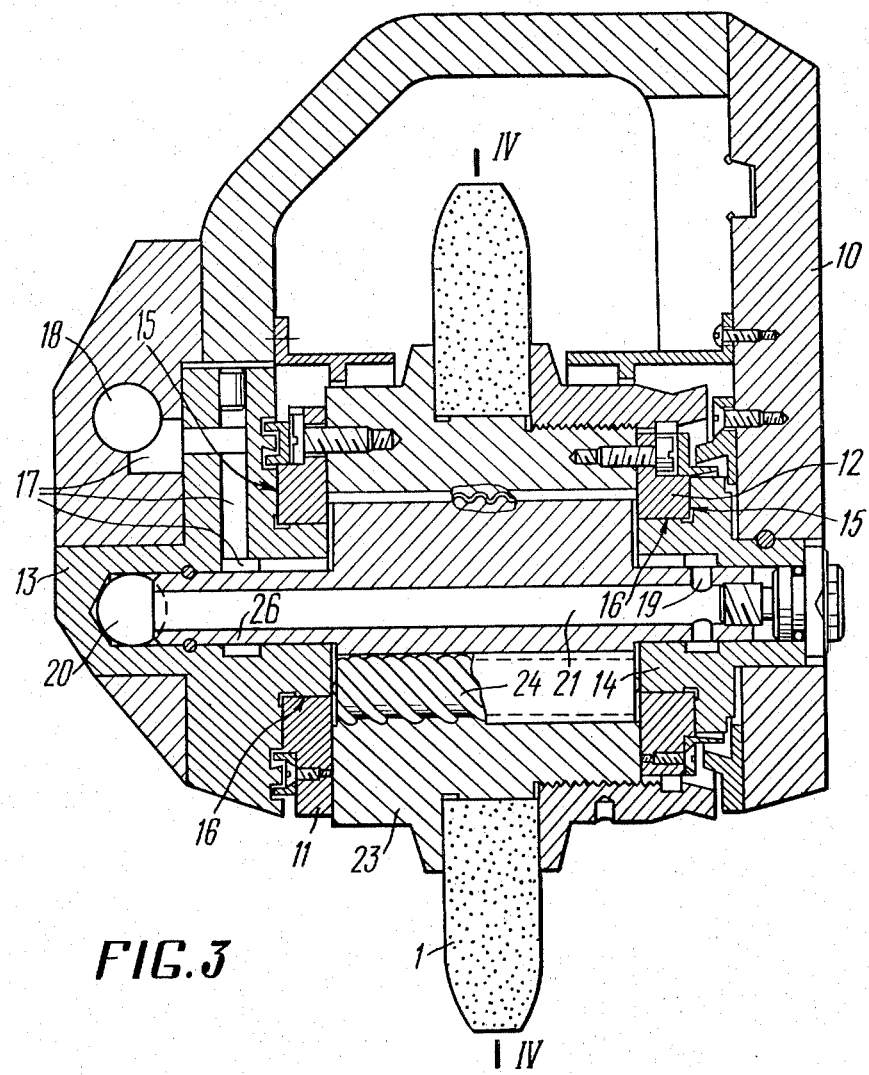
FIG. 3 is a longitudinal section of the spindle assembly according to the invention, partly cut away, with the internal-tooth sun wheel serving as the driven member of the drive.

Illustrated in FIGS. 3 and 4 is a spindle assembly wherein, according to the invention, the sun wheel 23 has internal teeth and is rotated by the planet pinions 24 rotating in the sockets 25 of the cage 26. The cage 26 of rigidly secured by its journals on the housing 9 and its cover 10 which, taken together, constitute the immovable element of the assembly. The cutting tool is rigidly fastened to the sun wheel 23 which is the output driven member of the drive.

The cage 26 is sealed off at the ends by the device for the positive supply of the service fluid to the helical spaces at one end and for discharging it at the other.

The design of this devices is similar to that described heretofore.

The spindle assembly shown in FIGS. 3 and 4 functions in the main similarly to that described above. The service fluid is forced from the hydraulic system into the channel 18 wherefrom it flows through the channel 17 to the helical spaces 6 and 7 adjoining the flange 11.

The fluid flow along the axis of the planet pinions 24 from the flange 11 to the flange 12 puts the contact lines 8 of the meshing teeth in suction in the same direction. The forced displacement of the contact lines 8 along the axis of the planet pinions 24 turns said planet pinions around their own axes since the teeth mesh along the matching helical surfaces.

The constantly of meshing of the planet pinions 24 with the sun sheel 23 is ensured by the cylindrical shape of the sockets 25 of the cage 26, said sockets being located at a definite distance from the rotation axis of the sun wheel 23. Hence, rotation of the planet pinions 24 around their own axes with the cage 26 rigidly fixed causes corresponding rotation of sun wheel 23 which carries the cutting tool 1 and is the output member of the drive. Similarly to the spindle assembly described above, the design shown in FIGS. 3 and 4 always has a number of helical spaces 6 and 7 separated by two or more contact lines 8. The service fluid contained in these helical spaces is hermetically separated both from the helical spaces adjoining the flange 11 and from those adjoining the flange 12.

As the teeth come out of mesh, these spaces are put in communication with the channel 19 of the flange 14 and the service fluid is discharged through the channels 21 and 20. Hermetic separation of the helical spaces 6 and 7 from each other is ensured by the fact that the teeth of the planet pinion 24 are embraced on the outside diameter by the cylindrical sockets 25 of the cage 26 with small clearances and that the outer cylindrical surface 27 of the cage 26 is embraced will small clearances by the surface of the tooth tops of the sun wheel 23.

Owing to the fact that the meshing pairs of teeth come in mesh simultaneously on both sides of the tooth and along its whole depth i.e., in the same way as in the above described spindle assembly, the helical spaces are divided along the rotation axis of the sun wheel into two or more helical spaces hermetically separated from each other. In the same way as in the above described spindle assembly, the number of teeth of the planet pinions and sun wheel, the number of planet pinions as well as the axial pitch of the helical spaces and the length of their threads are interrelated in this design by the condition requiring that the helical spaces adjoining the flange 11 must be hermetically separated from identical spaces adjoining the flanges 12 at any angular position of the planet pinion 24 relative to the sun wheel 23.

The spindle assembly shown in FIGS. 3 and 4 can be used successfully with medium — and large-size grindstones.

The supporting power and stiffness of the radial support of such a grinding unit will be determined mainly by the hydrodynamic forces arising in the oil clearance between the outer cylindrical surface 27 of the cage 26 and inner toothed surface of the sun wheel 23 as well as in the clearance between the outer cylindrical surfaces of the tooth tops of the planet pinions 24 and the inner cylindrical surfaces of the sockets 25 of the cage 26. Besides, hydrostatic forces will be formed at the contact lines 8 of the meshing tooth pairs separated by an oil layer.

From the viewpoint of the speed rigidity of the cutting tooth rotation drive the spindle assembly considered now will be similar to that described above and shown in FIGS. 1 and 2.

Figure 6:
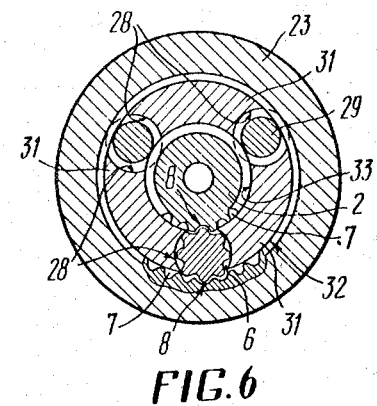
FIG. 6 is a section taken along line VI—VI in FIG. 5.
Figure 5:
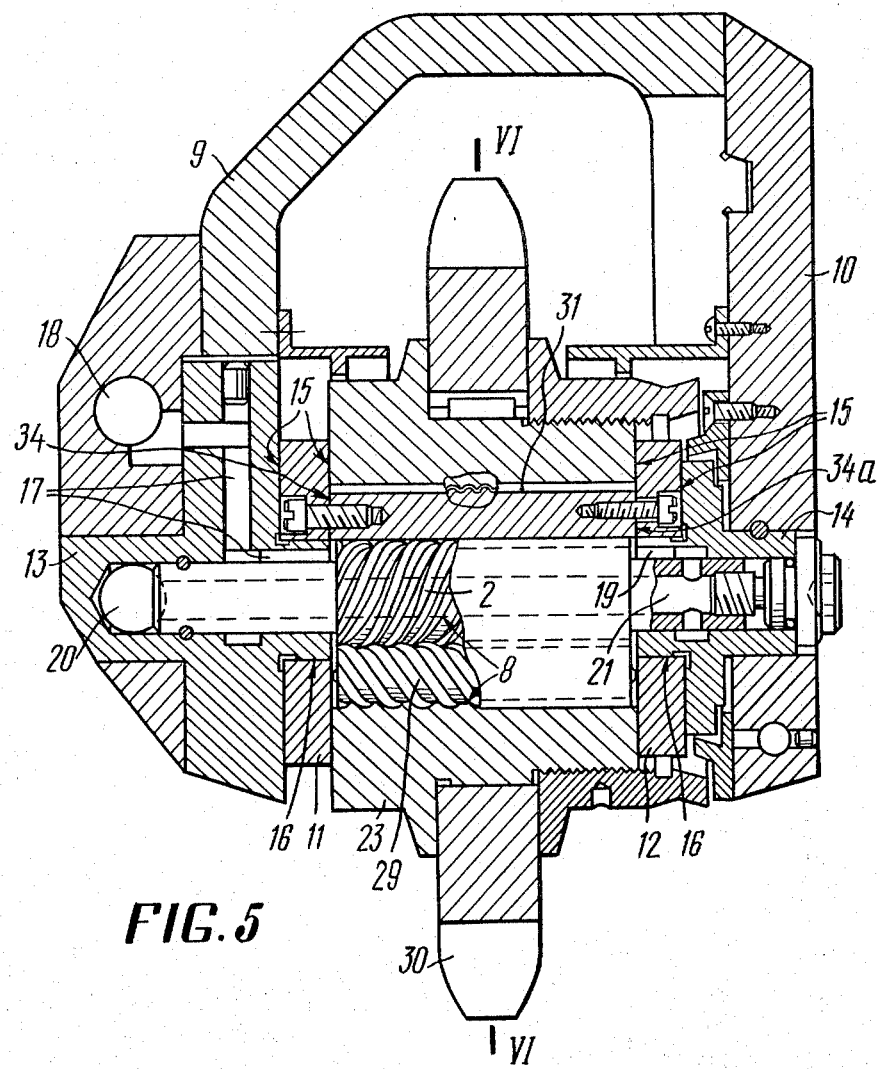
FIG. 5 is a longitudinal section of the spindle assembly according to the invention, partly cut away, with the second internal-tooth sun wheel serving as the driven member of the drive.

In FIGS. 5 and 6 is illustrated a spindle assembly which, according to the invention, comprises two sun wheels 2 and 23 one of which (2) has external teeth and is rigidly secured to the immovable element — housing 9 and its cover 10, the other sun wheel (23) with internal teeth is set in rotation when the planet pinions 29 roll over the sun wheel 2.

The sun wheel 23 is an output driven member of the drive, carrying the cutting tool, i.e., milling cutter 30.

The cage 31 made in the form of a composite bushing connected at the ends by the flanges 11 and 12 has outer 32 and inner 28 and 33 cylindrical surfaces which adjoin the outer and inner surface of tooth tops of the planet pinions 29 and sun wheels 23 and 2 with small clearances.

The cage 31 is hermetically sealed at the ends 34 and 34a (FIG. 5) by a device which serves simultaneously for supplying and discharging the service fluid.

The spindle assembly operates, mainly, similarly to those described above.

The service fluid is forced through channels 18 and 17 to the helical spaces 6 and 7 adjoining the flange 11. The forced displacement of the contact lines 8 by the service fluid from the flange 11 to the flange 12 causes the planet pinions 29 to roll around the wheel 2 because the teeth mesh along the matching helical surfaces.

The helical spaces adjoining the flange 11 are hermetically separated from the spaced adjoining the flange 12 by the cylindrical surfaces 28, 32, 33 of the cage, and by the proper selection of the number of teeth of the planet pinions and sun wheels, the number of planet pinions, the pitches and lengths of the helical spaces in order that each helical space 6 and 7 would be hermetically separated along the rotation axis by one or more contact lines 8 so that there always would be a certain number of helical spaces 6 and 7 separated by two or more contact lines 8 at any angular position of the sun wheel 23 relative to the sun wheel 2.

The service fluid in these hermetically separated helical spaces is sealed off both from the helical spaces adjoining the flange 11 and from those adjoining the flange 12. Like in the above-described designs the profiles of the meshing teeth are selected so as to ensure the contact of the meshing pair of teeth on both sides of the tooth and throughout its depth. As the teeth come out of mesh at the side of the flange 12, the service fluid enters the channel 19 of the flange 14 and is further discharged through the channels 21 and 20.

The device B comprises flanges 11 and 12 rigidly connected with the corresponding end of the cage 31, and flanges 13 and 14 connected, respectively, with the housing 9 and its cover 10. The ends of the flanges 11 and 12 adjoining the faces of the flanges 13 and 14 and the face ends of the sun wheel 23 from four movable end seals 15, besides, flanges 11, 13 and 12, 14 form movable radial seals 16.

As in the above-described device for supplying the service fluid to the helical spaces at one end of the cage and discharging it from the other end, the similar device of this spindle assembly comprises similar channels for the forced supply of the service fluid to the helical spaces 6 and 7 at one end of the cage 31 and its discharge at the other end.

The spindle assembly illustrated in FIGS. 5 and 6 can be utilized most successfully as a milling spindle assembly subjected to considerable loads of the cutting forces because the supporting power and stiffness of its radial support are several times higher than can be provided by the radial supports incorporating rolling contact bearings. This is due to rolling of a convex toothed wheel surface over a concave helical surface whose radiuses of curvature at the point of their contact are similar to each other. In this case the contact area is several times larger than in the roller bearings where the rollers are in linear contact with the bearing races.

This speed rigidity of the cutting toll rotation drive in the spindle assembly under consideration is equal to that of the spindle assemblies in FIGS. 1, 2, 3, 4.

Figure 8:
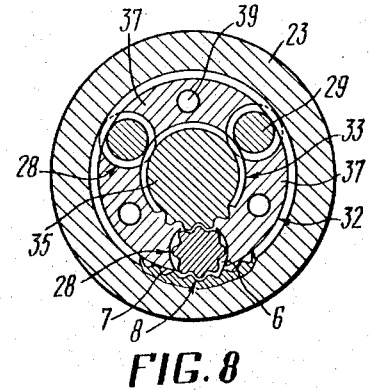
FIG. 8 is a section taken along line VII—VII in FIG. 7.
Figure 7:
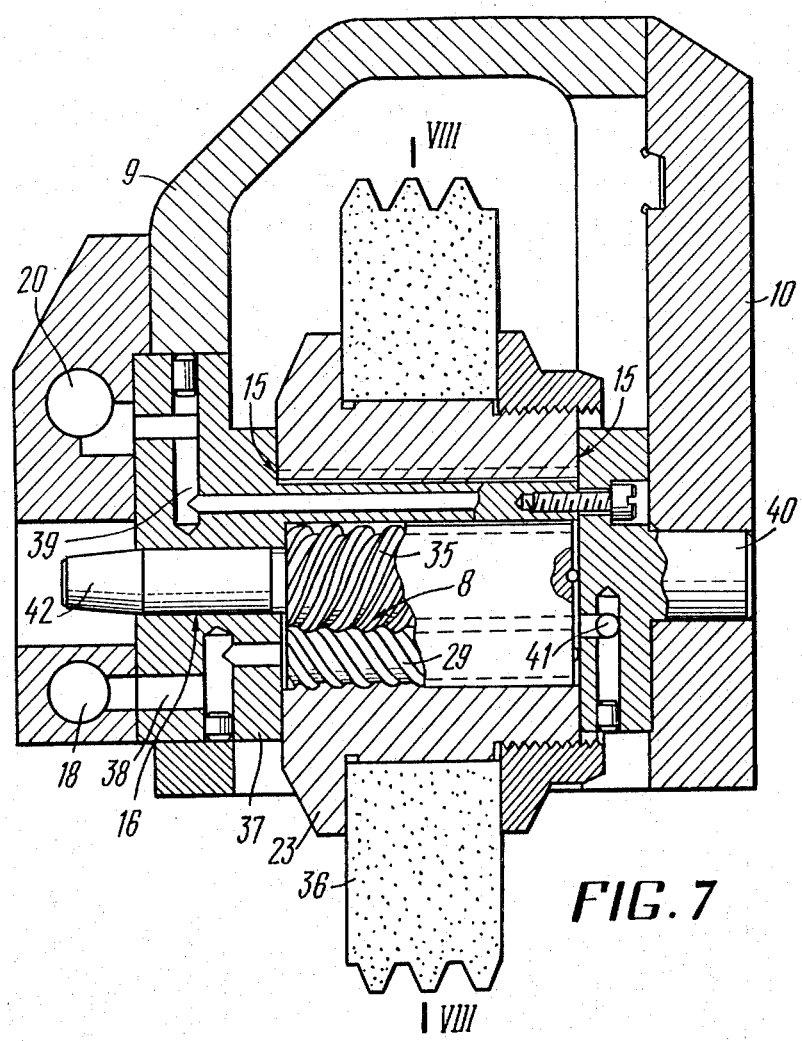
FIG. 7 is a longitudinal section of the spindle assembly according to the invention, partly cut away, in which the driven member of the drive is constituted by the second internal-tooth sun wheel with the cage being immovable.

Shown in FIGS. 7 and 8 is a spindle assembly wherein, according to the invention, there are two sun wheels 23 and 35 with internal and external teeth, respectively.

The sun wheel 23 with internal teeth is the output driven member of the drive, carrying the cutting tool, i.e., the worm-type grindstone 36.

The sun wheel 23 is set in rotation as the planet pinions 29 turn in the sockets 28 of the cage 37.

The cage 37 is of a composite construction and is secured rigidly to the immovable element of the assembly, i.e., to the housing 9 and its cover 10. At one end this cage is combined with a flange having channels 38 supplied with the service fluid under pressure. Secured to the other end of the cage 37 is a flange 40 incorporating channels 41 which communicate with the discharge channel 29 through the channels 39 made in the cage 37.

The cage 37 is located between the sun wheels 23 and 35 and its external 32 and internal 28 and 33 cylindrical surfaces adjoin with small clearance the outer and inner surfaces of the tooth tops of the planet pinions 29 and sun wheels 23 and 35. In this case the helical spaces 6 and 7 formed by the teeth of the planet pinion 29 and those of the sun wheel 23 and 35 are separated from each other by the surfaces 28, 32 and 33 of the cage 37.

Pressure tightness of the helical surfaces 6 and 7 is ensured by the movable end seal 15 between both end faces of the sun wheel 23 and the faces of the cage 37 and flange 40. Besides, the sun wheel 35 is sealed off by the movable radial seal 16 between the journal of the sun wheel 35 and the axial hole in the cage 37. Like in the spindle assembly shown in FIGS. 5 and 6, the profile of the meshing teeth in the spindle assembly under consideration, the number of teeth of the planet pinions 29 and sun wheels 23 and 35 , the number of planet pinions, the pitches and thread lengths of the helical spaces 6 and 7 are interrelated by the condition which requires constant sealing of the helical spaces 6 and 7 communicating with the fluid supply channel from the helical spaces connected to discharge at any angular position of one sun wheel with relation to the other .Each helical space 6 and 7 is hermetically divided by the contact lines 8 along the wheel rotation axes into two or more spaces.At any angular position of the sun wheels there always is a certain number of helical spaces 6 and 7 divided along the rotation axis into at least spaces. Besides, the profiles of the meshing teeth are similar to those used in the above-described spindle assemblies so that they allow mutual rolling of the meshing planet pinions 29 and sun wheels 23 and 35 owing to the forced progressive motion of the contact lines 8 along the rotation axis.

The spindle assembly shown in FIGS. 7 and 8 operates as follows.

The service fluid flows through channels 18 and 38 (FIG. 7) to the helical spaces 6 and 7 (FIG. 8) and its forced flow along the axis makes the contact lines 8 of the meshing teeth move progressively too. This is accomplished by the relative rotation of the planet pinions 29 and sun wheels 23 and 35. Inasmuch as the cage is secured to the immovable element of the assembly, the rotation axes of the planet pinions 29 will also be immovable, as a result, the sun wheels 23 and 35 will rotate in opposite directions. As the teeth come out of mesh at the side of flange 40 (FIG. 7) the service fluid will enter the channels 41 from which it will be discharged through the cage channels 39 into the channel 20.

The spindle assembly illustrated in FIGS. 7 and 8 can be used to the best advantage as a grinding assembly in gear grinding machines whose grinding tool is an abrasive worm. In this case the kinematic relation between the speeds of the grindstone 36 and the machined gear can be ensured by the sun wheel 35 and, in particular, by its tapered extension 42. The supporting power and rigidity of the radial support will depends on the hydrodynamic and hydrostatic forces arising in the oil layers which separate the surfaces moving relative to each other in the support.

The speed rigidity of the cutting tool rotation drive is the same as in the spindle assembly described above and shown in FIGS. 1, 2.

All the above-described versions of the spindle assemblies are capable of machining helical toothed surfaces in small -diameter holes because they can be set at any angle to the axis of the work while the service fluid can be supplied along the axis of the work to any length with the aid of flexible hoses.

What is claimed is:

1. A spindle assembly wherein the non-cantilevered cutting tool is mounted on a radial support; said radial support in the form of a helical-tooth spur-gear drive comprising: as the most, two sun wheels and a cage with sockets, mounted coaxially with a provision for relative rotation, the planet pinions accommodated in said cage sockets and meshing constantly with at least one of said wheels; said cage forming helical spaces with the teeth of said wheel and planet pinions; said helical spaces separated hermetically along the tooth contact lines; a device which seals off said cage at the ends and supplies the service fluid to said helical spaces at one end of said cage and discharges it at the other end so that said gear drive serves as a hydraulic motor for rotating said cutting tool secured to the output member of said drive.

2. A spindle assembly according to claims 1 which comprises one external-tooth sun wheel rigidly secured to the immovable element of the assembly while the cage is set in rotation when the planet pinions roll around said sun wheel and serves as the output member of the drive, carrying the cutting tool.

3. A spindle assembly according to claim 1 which comprises one internal-tooth sun wheel which is set in rotation as the planet pinions rotate in the sockets of the cage rigidly secured to the immovable element of the assembly, said sun wheel serving as the output member of the drive, carrying the cutting tool.

4. A spindle assembly according to claim 1 which comprises two sun wheels one of which, with external teeth, is rigidly secured to the immovable element of the assembly, while the other one, with internal teeth, is set in rotation as the planet pinions roll around said external-tooth sun wheel and serves as the output member of the drive, carrying the cutting tool.

5. A spindle assembly according to claim 1 which comprises two sun wheels, one with external teeth and the other one with internal teeth the latter wheel serving as the output member of the drive, carrying the cutting tool; both of said sun wheels are set in rotation as the planet pinions rotated in the sockets of the cage rigidly fastened to the immovable element of the assembly.

* * * * *